United States Patent [19]

Elsässer et al.

[11] 4,443,951
[45] Apr. 24, 1984

[54] ARRANGEMENT FOR THE MEASURING AND CORRECTING OF THE STEERING GEOMETRY OF MOTOR VEHICLES

[75] Inventors: Claus Elsässer; Günther Ross, both of Oberndorf; Volker Schwarz, Zimmern, all of Fed. Rep. of Germany

[73] Assignee: Mauser-Werke Oberndorf GmbH, Oberndorf, Fed. Rep. of Germany

[21] Appl. No.: 283,833

[22] Filed: Jul. 16, 1981

[30] Foreign Application Priority Data

Jul. 17, 1980 [DE] Fed. Rep. of Germany ....... 3027089

[51] Int. Cl.³ .............................................. G01B 5/255
[52] U.S. Cl. ................................................... 33/203.13
[58] Field of Search ........... 33/203.12, 203.13, 203.15, 33/203.16, 203

[56] References Cited

U.S. PATENT DOCUMENTS

| | | | |
|---|---|---|---|
| 2,378,631 | 6/1945 | Holmes | 33/203.12 |
| 2,702,432 | 2/1955 | Martin | 33/203.13 |
| 3,546,782 | 12/1970 | Peredue et al. | 33/203.13 |
| 3,908,280 | 9/1975 | Murakami et al. | 33/203.13 |

FOREIGN PATENT DOCUMENTS

| | | |
|---|---|---|
| 424288 | 1/1965 | Switzerland . |
| 540476 | 7/1971 | Switzerland . |
| 544300 | 10/1971 | Switzerland . |

*Primary Examiner*—William D. Martin, Jr.
*Attorney, Agent, or Firm*—Scully, Scott, Murphy & Presser

[57] ABSTRACT

An arrangement for the measuring and correction of the steering geometry of motor vehicles, in particular their alignment and camber angles, through the intermediary of mechanical components associated with each wheel of a wheel pair and which serves for the scanning of the actual value of the wheel angles, whereby the values determined in this manner are converted into electrical signals through the utilization of data pick-ups and are then displayed. This arrangement essentially inventively consists of in that in the measuring of the steering geometry provided as the measuring basis on the wheel suspension of a wheel pair with the utilization, for instance, of individually adjustable wheel positioning elements, of which each is connected with a carriage extending transverse of the travelling direction of the wheels and supporting the actual value scanning elements, and in which one of the two wheel positioning elements has associated therewith a longitudinal measuring system serving for the correction of the alignment angle ($\alpha$), during the displacement of which there is produced a correction angle ($\alpha_k$) in a calculator connected to the output thereof, and in conjunction with the actual value wheel angle ($\alpha$) separately obtained for each wheel of the wheel pairs superimposes itself in the counters associated with the calculator as well as with the measured value pick-ups associated with the inherent wheels, and which are displayed as a real correcting magnitude, whereas the actual value wheel angle ($\beta$) of each wheel is conveyed directly to the counters.

10 Claims, 3 Drawing Figures

ARRANGEMENT FOR THE MEASURING AND CORRECTING OF THE STEERING GEOMETRY OF MOTOR VEHICLES

BACKGROUND OF THE INVENTION

1. Field of the Invention

The present invention relates to an arrangement for the measuring and correction of the steering geometry of motor vehicles, in particular their alignment and camber angles, through the intermediary of mechanical components associated with each wheel of a wheel pair and which serves for the scanning of the actual value of the wheel angles, whereby the values determined in this manner are converted into electrical signals through the utilization of data pick-ups and are then displayed.

The travelling properties of a motor vehicle depend in an important extent, upon a condition of its steering geometry, in effect, upon the alignment and the camber of the wheels. A carefully measured, and in case of need correspondingly corrected steering geometry, has a not insignificant influence on tire wear and on fuel consumption.

Arrangements for the measurement of the drive mechanism geometry of motor vehicles as well as of corresponding methods of operation have been known for a long period of time. However, arrangements of that type as well as the operating procedures developed therefore are incapable of being optimized not only in constructive but, above all, also in technologically conceptual respects.

2. Discussion of the Prior Art

In Swiss Pat. No. 540,476 there has already been proposed a measuring arrangement for the measurment of the driving mechanism geometry for motor vehicles. The motor vehicle which is to be measured is hereby oriented on the arrangement in accordance with its longitudinal center axis. Restricted to practically identical prerequisites is also the (operational) method proposed in Swiss Pat. No. 544 300. For the automatic determination of the symmetrical longitudinal axis of the motor vehicle, as well as the angular inclination of the forward wheels of the vehicle, also in this instance one proceeds from the vertical plane extending through the symmetrical longitudinal axis.

Another, similar type of procedure is, in addition thereto, proposed in Swiss Pat. No. 424,288, in the practical embodiment of which there is measured, for example, the angle of inclination between the longitudinal center axis of the vehicle and the forward or rear axle at the crossing points.

As has been shown, the disadvantage of those types of arrangement and (operating) procedures lies in their technical conception since this, as a rule, always requires a plurality of reference axes. Thus it lies at hand that even in this case, in effect within the conceptional scope, that there is produced significantly large source for measuring errors.

SUMMARY OF THE INVENTION

Accordingly, it is an object of the present invention that, with a known deviation from the already previously proposed conceptions and the therefrom again resultant sources of measuring errors, there can be created a relatively simple and operatively dependable arrangement, also in its construction, for the measurement and correction of the steering geometry of motor vehicles.

This arrangement essentially inventively consists of in that in the measuring of the steering geometry grounded as the measuring basis on the wheel suspension of a wheel pair with the utilization, for instance, of individually adjustable wheel positioning elements, of which each is connected with a carriage extending transverse of the travelling direction of the wheels and supporting the actual value scanning elements, and in which one of the two wheel positioning elements has associated therewith a longitudinal measuring system serving for the correction of the alignment angle ($\alpha$), during the displacement of which there is produced a correction angle ($\alpha_k$) in a calculator connected to the output thereof, and in conjunction with the actual value wheel angle ($\alpha$) separately obtained for each wheel of the wheel pairs superimposes itself in the counters associated with the calculator as well as with the measured value pick-ups associated with the inherent wheels, and which are displayed as a real correcting magnitude, whereas the actual value angle ($\beta$) of each wheel is conveyed directly to the counters.

The calculator may be a readily available commercial calculator or computer of the type which effectuates the four basic computations; in effect, addition, subtraction, multiplication and division. The function thereof is usually such wherein measurement signals are taken up and preferred by the actual value scanning elements of the carriages. The measurement signals are then converted into count pulses, which are added forwardly, as well as backwardly, in accordance with the actual value determination. These added values, or sums, are then further processed in a reference-actual value comparator. This signifies that value which is indicated by the scanning elements, which is converted into count pulses, is compared with preset reference values. The result of this comparison is transmitted to the measuring and correcting arrangements as the correcting parameter or correcting angle, with consideration being given to the individual arm lengths of the scanning elements. An eventual correction is undertaken; for example, the tilt position of the vehicle, and the reference-actual value comparison repeated in the event that this appears to be necessary.

Further inventive features, particularly with respect to the constructional arrangement and any modification can be ascertained from the following detailed description of the invention.

A series of advantages are obtained through the intermediary of the present invention, as follows:

The arrangement is predicated upon the concept that as the basis of measurement there is utilized the respective wheel suspensions of a wheel pair. This signifies that all measurements, as well as the occasionally required correction of the alignment and camber angles proceed from a single reference axis. Hereby, there can be extensively precluded measuring errors as well as inaccuracies in measurements.

Due to the simplicity of the technical concept on which there is based the proposed arrangement, also the necessary components required for determining the alignment and camber angles can thus be correspondingly simply constructed. A construction of that type is in the same measure, also applicable to the components serving for the correction of the alignment and camber angles.

The position of the vehicle measuring base relative to the measuring arrangement can be quite easily corrected and, in addition, without complex apparatus. Hereby, it is possible to bear a fine orientation of the vehicle so that, at the end, the measuring and correcting procedure can take place within a short time, more dependably than in comparison with the known arrangements and (operating) procedures. In addition thereto there can be indicated that all of the measuring and correction elements for the steering geometry are quite readily accessible along the outer end surfaces of the arrangement. A further advantage which is obtained by means of the proposed invention, finally consists of the utilization and association of multiple serviced electrical or electronic modules such as, for example, incremental angle indicators and forward-backward counters.

BRIEF DESCRIPTION OF THE DRAWINGS

Reference may now be had to the following detailed description of an exemplary embodiment of the invention, taken in conjunction with the accompanying drawings; in which.

DETAILED DESCRIPTION

Figure 1:
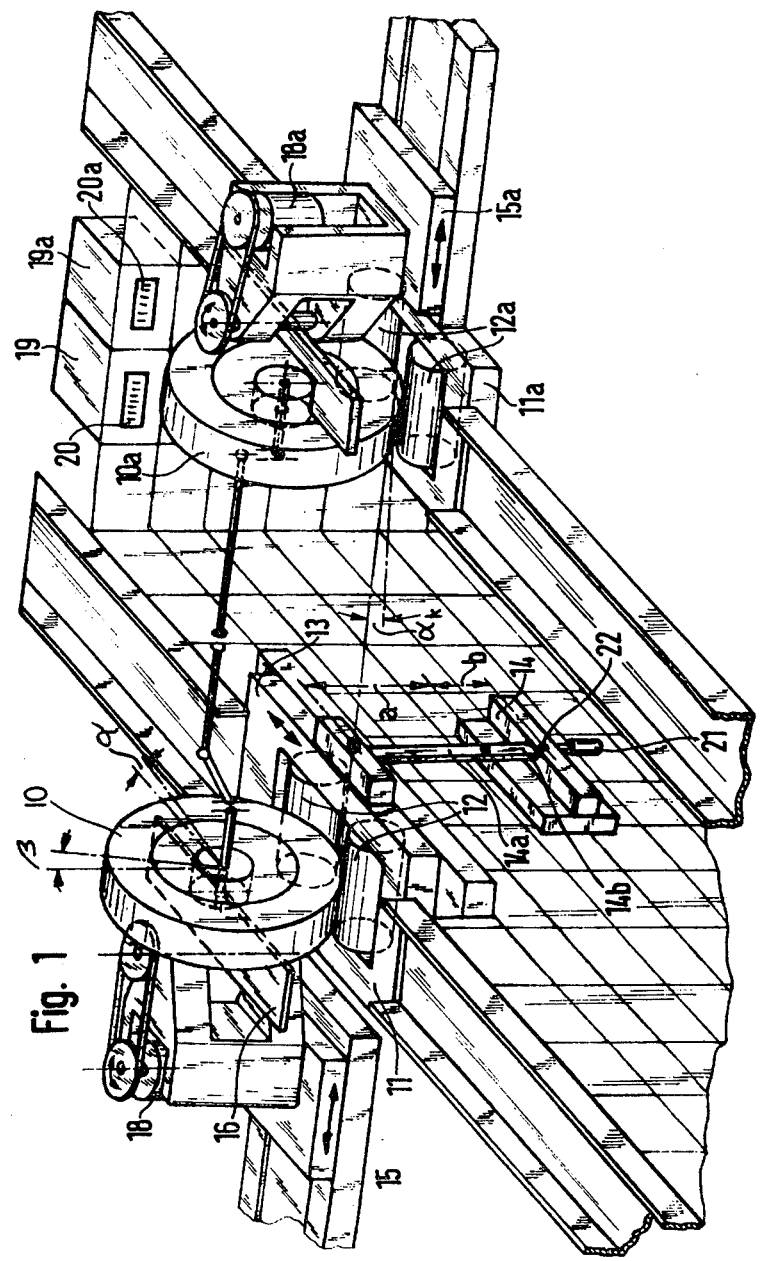
FIG. 1 illustrates a perspective representation of the inventive arrangement.

Referring to FIG. 1 of the drawings, the motor vehicle which is to be measured, or as needed, corrected with respect to its steering geometry has its wheels 10, 10a, such as the forward wheels, positioned into the two positioning components 11, 11a. The steering wheel (not shown) is locked by means of a positioning arrangement (also not shown). The component 11a serving for the positioning of the wheel 10a is stationarily arranged and is so constructed that the wheel 10a automatically centers itself between the roller pair 12a. The positioning element 11 for the wheel 10 which is located opposite the positioning element 11a is longitudinally displaceably in the direction of the wheel travel by means of a carriage 13. The present position of the wheel 10 is determined with the aid of a longitudinal or lengthwise measuring system 14. The two centering roller pairs 12, 12a are drivable through the intermediary of a motor. The wheel positioning element 11 will assume a position displaced in the longitudinal axis of the vehicle relative to the wheel positioning element 11a, when one of the wheel axles of the wheel pair 10, 10a which are to be measured is tilted. According to the present invention, the arrangement is so constructed that the tilted position of the vehicle axle need not be corrected first in a cumbersome and time consuming process before there can be commenced the measurement and the eventual correction of the wheel angle positions.

Figure 2:
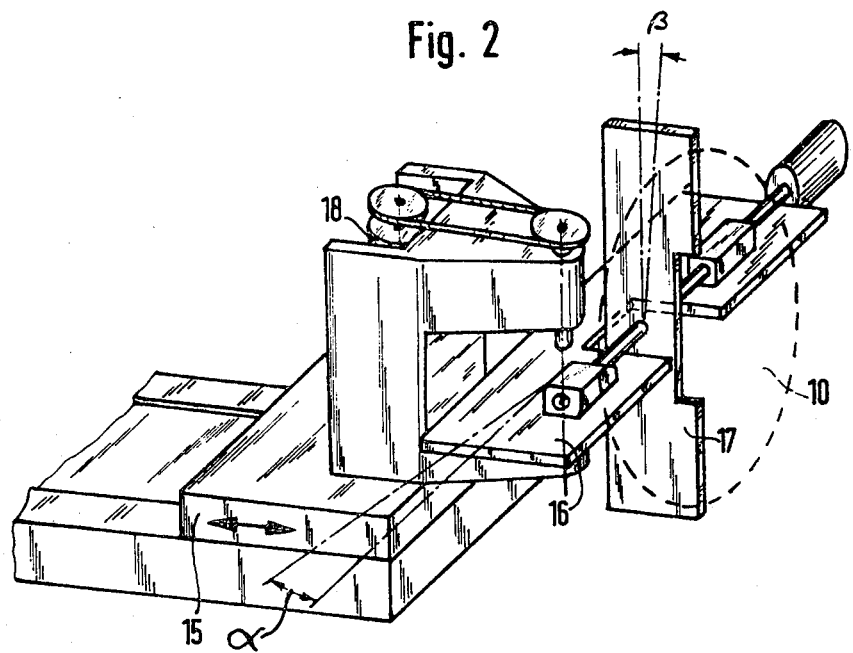
FIG. 2 illustrates a measuring carriage arranged transverse to the wheel travelling direction with angle indicator and measuring straight edges in an enlarged perspective representation.
Figure 3:
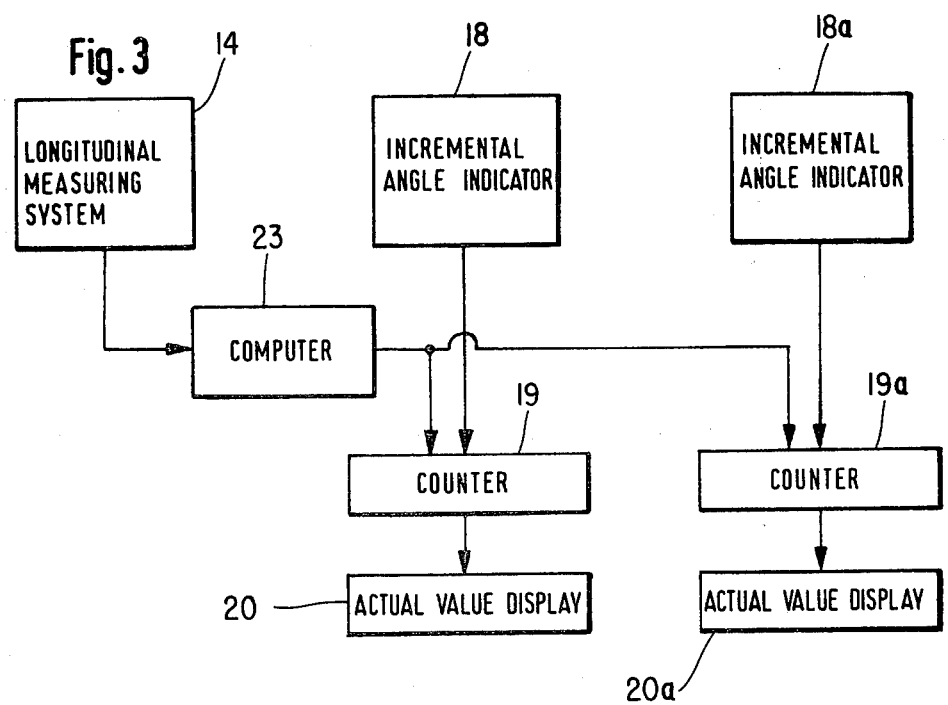
FIG. 3 is a schematic block circuit diagram for the mounting and assembly arrangement of the longitudinal measuring system, the indicator, the calculator, the counters and the displays.

Extending transverse to the direction of travel of the wheels 10, 10a are displaceably arranged carriages 15, 15a, which serve for receiving and positioning of the actual value scanning elements on first and second wheel angle mesuring means, such as the measuring straight edges 16, 16a and 17 (FIG. 2) as well as the incremental angle indicator 18, 18a. The measuring straight edges 16 (16a) are hereby arranged horizontally, and the measuring straight edges 17 (17a) are arranged vertically.

When the measuring straight edges 16 (16a), 17 (17a) are brought into the measuring position against the wheels 10, 10a by the carriages 15, 15a; then the currently scanned measured values are rendered visible in the actual value displays 20, 20a and as the angular position of the wheels 10, 10a through the incremental angle indicator 18, 18a, the longitudinal measuring system 14, and the forward and backward counters 19, 19a. Hereby, there is directly determined and displayed each change in the position of the wheels 10, 10a. The angles for the alignment which are identified by ($\alpha$) are then the current instantaneous actual or effective values.

The measurement of the desired correcting angle ($\alpha_k$) is obtained from the relationship of the track width (W) relative to the value ($\Delta_x$) of the displacement of the carriage 13 in the direction of wheel travel or longitudinal direction. The track width (W) corresponds herein to the proportional element (a)=lever 14a and the displacement ($\Delta_x$) of the proportional element (b)=lever 14b. By means of calibrated measuring screw 21, the transfer linkage 22 can be directly displaced relative to the measuring system 14.

At a given track width (W), for example 1331 mm, there is obtained the set value ($\Delta_y$) at the measuring screw 21, as follows:

$$\Delta_y = W \text{(mm)}/100 = \text{(mm)}$$

$$\Delta y = 1331/100 = 13.31.$$

The measuring of the wheel camber angle ($\beta$) and the occssionally required correction thereof is effected analogously in the already previously described manner in accordance with the present actual value of the camber angle of the wheels 10, 10a being scanned by means of the vertically arranged measuring straight edges 17, (17a). The actual value of the camber angles ($\beta$) are transmitted directly to the counters 19, 19a.

In order to obtain precise measurement, as well as setting and correcting values, the presently precedent measurement is repeated after changing the wheel position by 180°, the present actual value is thus determined on "turnover". The positional change of the wheels 10, 10a by 180° is effected by means of the motor-driven centering roller pairs 12, 12a.

What is claimed is:

1. An arrangement for measuring and correcting the steering geometry of a motor vehicle, said arrangement comprising:
   (a) first and second wheel angle measuring means, each of said means being mounted on a carriage means for reciprocation into engagement with a pair of wheels to be measured, each of said means generating a signal indicative of the initial camber and toe in angle of the wheel being meaasured;
   (b) first and second wheel positioning means for supporting a pair of wheels to be measured,
   (i) said first wheel positioning means being fixed with respect to a transverse axis of reciprocation for said wheel angle measuring means;
   (ii) said second wheel positioning means being mounted for displacement along a longitudinal axis perpendicular to said transverse axis;

(c) measuring means for measuring the longitudinal displacement of said second wheel positioning means and generating a signal $\Delta_x$ indicative of said longitudinal displacement;

(d) computer means for generating a correcting angle $\alpha_k$ by comparing a track W with said signal $\Delta_x$;

(e) means for displaying the desired correcting $\alpha_k$ and the initial camber and toe in angles from said wheel angle measuring means.

2. An arrangement as claimed in claim 1, wherein said first and second wheel positioning means comprises two motor-driven centering roller pairs located axially-parallel to the motor vehicle wheel axles.

3. An arrangement as claimed in claim 2, wherein said second wheel positioning means comprises a further carriage; one of the said wheel positioning components and the associated centering roller pair being located on said carriage and displaceable in the wheel traveling direction.

4. An arrangement as claimed in claim 1, or 2, wherein said first wheel positioning means comprises a carriage displaceable transverse to the wheel traveling direction, said means also supporting the first wheel angle measuring means.

5. An arrangement as claimed in claim 1, wherein said wheel angle measuring means includes measuring straight edges having one horizontally extending pair for scanning an alignment angle ($\alpha$) and a vertically extending pair for scanning a camber angle ($\beta$).

6. An arrangement as claimed in claim 1, said means for measuring the longitudinal displacement for the correction of the alignment angle $\alpha$ comprises a lever translating means of predetermined proportion and a calibrated measuring screw for the adjustment of a transfer linkage.

7. An arrangement as claimed in claim 6, wherein said longitudinal measuring means associated with the wheel positioning component is displaceable in the wheel traveling direction.

8. An arrangement as claimed in claim 6, wherein the correcting angle ($\alpha_k$) is obtained from the relationship of the track width to longitudinal carriage displacement and these values are mechanically transferred to the lever translation, wherein the track width corresponds to a first proportional element and the longitudinal carriage displacement to a second proportional element.

9. An arrangement as claimed in claim 1, wherein the wheel angle measuring means are incremental angle detectors.

10. An arrangement as claimed in claim 1, wherein said display means for forward-backward counters.

* * * * *